United States Patent
Schreiber et al.

(10) Patent No.: US 8,209,742 B2
(45) Date of Patent: Jun. 26, 2012

(54) COMPUTER-IMPLEMENTED METHOD FOR OBTAINING A MINIMUM BICLIQUE COVER IN A BIPARTITE DATASET

(75) Inventors: Robert S. Schreiber, Palo Alto, CA (US); Alina Ene, Princeton, NJ (US); Nikola Milosavljevic, Stanford, CA (US); Robert E. Tarjan, Princeton, NJ (US); Mehul A. Shah, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 754 days.

(21) Appl. No.: 12/350,130

(22) Filed: Jan. 7, 2009

(65) Prior Publication Data

US 2010/0175111 A1 Jul. 8, 2010

(51) Int. Cl.
*H04L 29/06* (2006.01)
(52) U.S. Cl. ............................................. 726/2; 726/27
(58) Field of Classification Search .................. 726/2
See application file for complete search history.

(56) References Cited

U.S. PATENT DOCUMENTS

| | | | |
|---|---|---|---|
| 7,284,000 B2 | 10/2007 | Kuehr-McLaren et al. | |
| 7,380,025 B1 * | 5/2008 | Riggins et al. | 710/8 |
| 7,904,476 B1 * | 3/2011 | Schreiber | 707/785 |
| 2004/0243546 A1 | 12/2004 | Mishra et al. | |
| 2005/0138419 A1 * | 6/2005 | Gupta et al. | 713/201 |
| 2005/0138420 A1 | 6/2005 | Sampathkumar et al. | |
| 2008/0016104 A1 * | 1/2008 | Kuehr-McLaren et al. | 707/102 |
| 2009/0144803 A1 * | 6/2009 | Schreiber et al. | 726/1 |

OTHER PUBLICATIONS

Vaidya et al., "The Role Mining Problem: Finding a Minimal Descriptive Set of Roles", Jun. 20-22, 2007, ACM, pp. 175-184.*
Ene, Alina et al.; "Fast Exact and Heuristic Methods for Role Minimization Problems"; Jun. 2008; 1-10; Association for Computing Machinery; New York, NY, USA.

* cited by examiner

Primary Examiner — Matthew Smithers (57) ABSTRACT

A method includes providing a bipartite graph having vertices of a first type, vertices of a second type, and a plurality of edges, wherein each edge joins a vertex of the first type with a vertex of the second type. A unipartite edge dual graph is generated from the bipartite graph, and a minimum clique partition of the edge dual graph is recursively determined. A biclique is then created in the bipartite graph corresponding to each clique in the minimum clique partition of the edge dual graph.

20 Claims, 11 Drawing Sheets

|   | MCP(G') |
|---|---|
| 605<br>1st iteration | 1. Found isolated A4-B4<br>2. MCP (G') = A4-B4 + MCP (G' \ A4-B4) |
| 610<br>2nd iteration | MCP (G' \ A4-B4)<br>1. Found A1-B2 dominates A1-B1<br>2. Add A1-B2 to clique containing A1-B1 in MCP (G' \ {A4-B4 & A1-B2}) for MCP (G' \ A4-B4) solution |
| 615<br>3rd iteration | MCP (G' \ {A4-B4 & A1-B2})<br>1. Found isolated A1-B1<br>2. MCP (G' \ {A4-B4 & A1-B2}) = A1-B1 + MCP (G' \ {A4-B4 & A1-B2 & A1-B1}) |
| 620<br>4th iteration | MCP (G' \ {A4-B4 & A1-B2 & A1-B1})<br>1. Found A3-B2 dominates A3-B5<br>2. Add A3-B2 to clique containing A3-B5 in MCP (G' \ {A4-B4 & A1-B2 & A1-B1 & A2-B2 & A3-B2}) |
| 625<br>5th iteration | MCP (G' \ {A4-B4 & A1-B2 & A1-B1 & A3-B2})<br>1. Found isolated A2-B2<br>2. MCP (G' \ {A4-B4 & A1-B2 & A1-B1 & A3-B2} = A2-B2 + MCP (G' \ {A4-B4 & A1-B2 & A1-B1 & A3-B2 & A2-B2} |
| 630<br>6th iteration | MCP (G' \ {A4-B4 & A1-B2 & A1-B1 & A3-B2 & A2-B2})<br>1. Found A3-B5 dominates A3-B3<br>2. Add A3-B5 to clique containing A3-B3 in MCP (G' \ {A4-B4 & A1-B2 & A1-B1 & A3-B2 & A2-B2 & A3-B5}) for MCP (G' \ {A4-B4 & A1-B2 & A1-B1 & A3-B2 & A2-B2}) solution |
| 7th iteration<br>635 | MCP (G' \ {A4-B4 & A1-B2 & A1-B1 & A3-B2 & A2-B2 & A3-B5})<br>1. Found isolated A3-B3<br>2. MCP (G' \ {A4-B4 & A1-B2 & A1-B1 & A3-B2 & A2-B2 & A3-B5}) = MCP (G' \ {A4-B4 & A1-B2 & A1-B1 & A3-B2 & A2-B2 & A3-B5 & A3-B3}) |
| 8th iteration<br>640 | MCP (G' \ {A4-B4 & A1-B2 & A1-B1 & A3-B2 & A2-B2 & A3-B5 & A3-B3})<br>1. No vertices, MCP = empty |

COMPUTER-IMPLEMENTED METHOD FOR OBTAINING A MINIMUM BICLIQUE COVER IN A BIPARTITE DATASET

BACKGROUND

The present application relates generally to access control systems, and more particularly to role discovery and simplification in access control systems.

In a simple access control system, access control lists (ACLs) are used. An ACL lists the user accounts (users) that have permission to use a given resource. The resource may be a file, or a network machine (with an internet protocol address), or a service provided by a port on a network machine, for example.

Such a set of ACLs may have a very large number of entries. As a simple example, if one thousand users each had permission to use one thousand different resources, then the ACL set would have a total of one million (one thousand multiplied by one thousand) entries. As the number of users and the number of resources grow, the size of this representation becomes extremely large and unwieldy. It becomes difficult to maintain, to check, to store, to present to an administrator, and to visualize on a graphics display. Ultimately, it becomes difficult, expensive, and error-prone to manage.

One way to reduce the size of the representation of the access permission is to utilize role-based access control (RBAC). In an RBAC system, a new kind of entity, the role, is introduced. Herein, a role may be defined as a set of permissions. Users may have or be assigned roles. A given role confers to its users permission to use certain resources. In a bipartite graphical representation of users and resources, wherein user-resource permissions are represented by edges drawn between vertices of a first type that represent users and vertices of a second type that represent resources, these roles may be represented as bicliques.

In order to migrate from using a set of ACLs to using RBAC, an appropriate set of roles need to be discovered from the ACL data. The present application relates to a computer-implemented method for obtaining a minimum biclique cover in a bipartite dataset that can be applied to role discovery in access control systems.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 6 is a diagram of an illustrative recursive process of finding a minimum clique partition of the illustrative unipartite edge dual graph of FIG. 5, according to one exemplary embodiment of the principles described herein.

Throughout the drawings, identical reference numbers designate similar, but not necessarily identical, elements.

DETAILED DESCRIPTION

In some situations, it may be desirable to discover roles from a set of ACLs by representing users and the resources to which the users have been granted access as vertices in a bipartite graph. Furthermore, it may be desirable to determine an exact solution to the role discovery problem without relying on heuristics or other imprecise methods.

Therefore, in response to this and other issues, the present specification discloses systems and methods for obtaining a minimum biclique cover in a bipartite dataset. These systems and methods may be used in the discovery of a minimum set of roles from a set of ACLs that provide an exact solution. It should be understood, however, that while the methods and systems set forth herein will be described principally in the exemplary context of biclique role discovery in access control systems, the methods and systems are not necessarily limited to such applications. It is anticipated that the methods and systems described herein may be applied to any application wherein a discovery of a minimum biclique cover in a bipartite dataset is sought.

As used herein and in the appended claims, the term "bipartite" will be defined as relating to a graph having vertices that can be divided into two disjoint independent sets such that every edge connects a vertex of the first set with a vertex of the second set.

As used herein and in the appended claims, the term "unipartite" will be defined as relating to a graph having only one type of vertices.

As used herein and in the appended claims, the term "clique" will be defined as a set of vertices within a graph such that a connecting edge exists between every two vertices within the clique.

As used herein and in the appended claims, the term "biclique" will be defined as a first set of vertices of a first type and a second set of vertices of a second type such that every vertex in the first set is connected by an edge to every vertex in the second set.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Figure 1A:
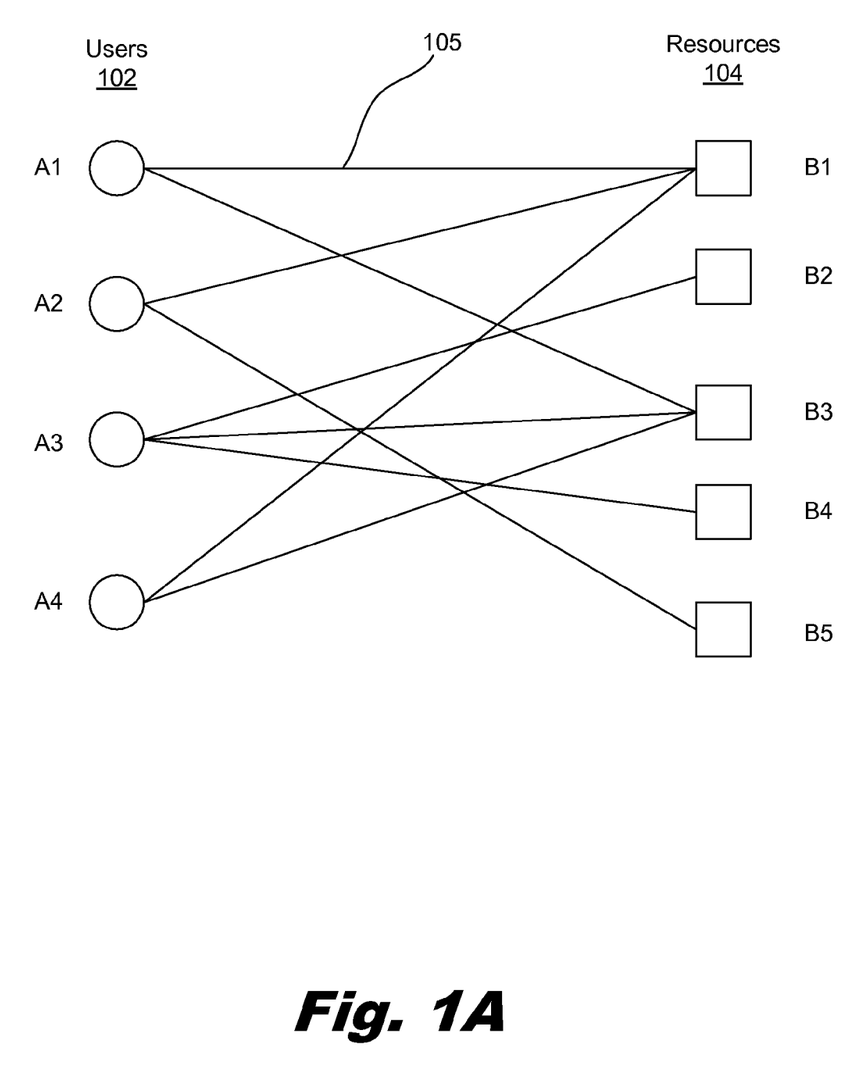
FIG. 1A is a diagram of an illustrative bipartite graph of relationships between vertices of a first type representing users and vertices of a second type representing resources, according to one exemplary embodiment of the principles described herein.

Referring to FIG. 1A, an illustrative bipartite graph (100) is presented showing a bipartite relationship between vertices of a first type (102) and vertices of a second type (104). In this example, the vertices of the first type (102) represent user accounts (users), labeled A1, A2, A3, and A4, and the vertices of the second type (104) represent resources, labeled B1, B2, B3, B4 and B5. Of course, in an actual network system employing an ACL set, the number of users and the number of resources may be much higher. Here, small numbers of users and resources are shown for purposes of simplified explanation.

Each of the users may have permission to access one or more resources. In the diagram, these permissions are indicated by edges (105) connecting individual users to individual resources. For example, user A1 has permission to access resources B1 and B3, user A2 has permission to access resources B1 and B5, and so on.

Figure 1B:
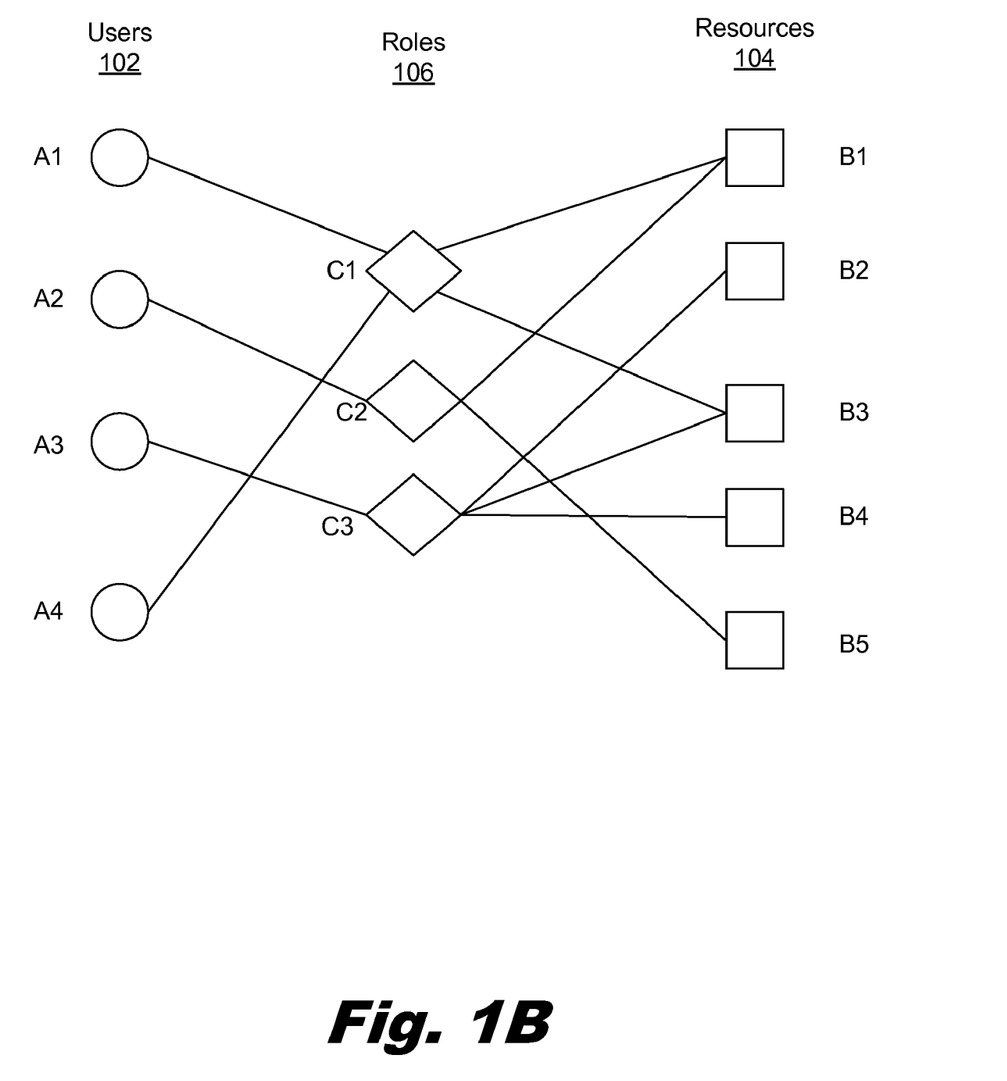
FIG. 1B is a diagram of an illustrative assignment of biclique roles to the vertices in the bipartite graph of FIG. 1A, according to one exemplary embodiment of the principles described herein.

Referring now to FIG. 1B, the permissions indicated by the edges (105) may be covered by biclique roles (106) such that each of the biclique roles (106) represents a set of permissions to a specific group of resources. Thus, each of the users that has a certain biclique role (106) may have permission to access each of the specific resources defined by the biclique role (106). For example, as shown in the present example, biclique role C1 provides permission to access both resource B1 and resource B3. Because user A1 and user A4 are associated with biclique role C1, both user A1 and user A4 have permission to access resources B1 and B3. Although the present example illustrates each user (101) having only one assigned biclique role (106), users may be assigned to as many biclique roles (106) as necessary to confer a desired set of permissions on the users. The biclique roles (106) may cover all the existing permissions of the users.

Figure 2:
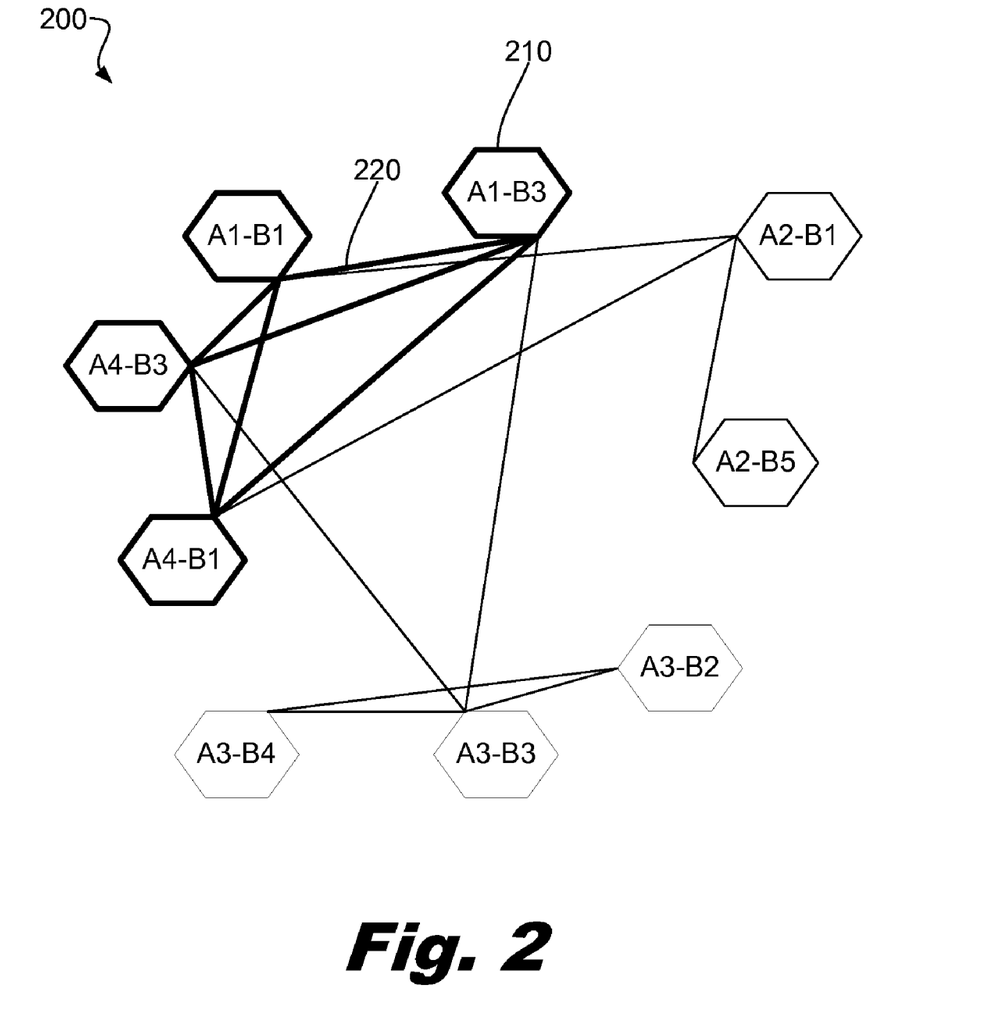
FIG. 2 is a diagram of a unipartite edge dual graph generated from the bipartite graph of FIG. 1B, according to one exemplary embodiment of the principles described herein.

Referring now to FIG. 2, an illustrative unipartite or unitary edge dual graph (200) of the bipartite graph (100, FIG. 1A) of FIG. 1A is shown. The unitary edge dual graph (200), also referred to herein for brevity as simply an "edge dual graph," may be used to discover biclique roles in a bipartite user-resource graph in the following manner.

As described above, the use of biclique roles (106) to cover permissions between users and resources may simplify and optimize the storage and organization of resource permissions, especially where such permissions can be redundant for multiple users and/or resources. Referring back to the bipartite graph of FIG. 1A, each biclique role corresponds to a biclique of users and resources. In biclique role discovery, then, the goal is to find a minimum biclique cover of the edges (106) in a bipartite graph of permissions between users and resources.

Two edges in a bipartite graph whose four endpoints are distinct and are not completely connected (by two additional edges) are said to be independent. Two edges are adjacent if they are not independent. If two edges can be covered by a single biclique, then clearly the three (or four) vertices that are endpoints of these two edges are completely connected and form a small biclique, so the two edges must be adjacent, and hence a pair of independent edges cannot both be covered by a single biclique.

Let G=(V, E) be a given bipartite graph in which a minimum biclique cover is sought, where V represents the set of vertices in the graph and E represents the set of edges present in the graph. An edge dual graph G' of the given bipartite graph may be constructed such that the edges E of G become the vertices G', and a pair of vertices in G' is connected by an edge if and only if the corresponding edges of G are adjacent and/or members of a common biclique.

In such a situation, the vertices of a (maximal) clique in G' correspond to a set of edges of G whose endpoints are a (maximal) biclique in G. The edges covered by a (maximal) biclique in G induce a (maximal) clique in G'. Thus, every biclique edge cover of G corresponds to a collection of cliques of G' whose union contains all of the vertices of G'. From such a collection, a clique partition of G' may be obtained by removing any redundantly covered vertex from all but one of the cliques to which it belongs. Similarly, any clique partition of G' corresponds to a biclique cover of G. Thus, the biclique cover number of a bipartite graph G is the clique cover number (the size of a minimum clique partition) of G'.

In the present example, the present edge dual graph (200) corresponds to the bipartite graph (100, FIG. 1A) of FIG. 1A. Accordingly, each of the vertices (210) of the edge dual graph (200) corresponds to an edge (105, FIG. 1A) in the bipartite graph (100, FIG. 1A). Each of the vertices (210) is labeled with the endpoints of its counterpart edge (105, FIG. 1A) in the bipartite graph. For example, vertex A1-B1 corresponds to the edge (105, FIG. 1A) between user A1 and resource B1 in FIG. 1A. Because this edge (105, FIG. 1A) is adjacent to an edge (105, FIG. 1A) between user A1 and resource B3, an edge (105, FIG. 1A) between user A4 and resource B3, and an edge (105, FIG. 1A) between user A4 and user B1 in the bipartite graph (100, FIG. 1A), edges (220) are drawn between vertex A1-B3 and vertices A1-B1, A4-B3, and A4-B1 in the edge dual graph (200).

Furthermore, since edges A1-B1, A1-B3, A4-B3, and A4-B1 form a biclique in the bipartite graph (100, FIG. 1A), their counterpart vertices (210) in the edge dual graph (200) form a clique, as described above. The edges (220) in the clique are highlighted for clarity in FIG. 2.

Figure 3:
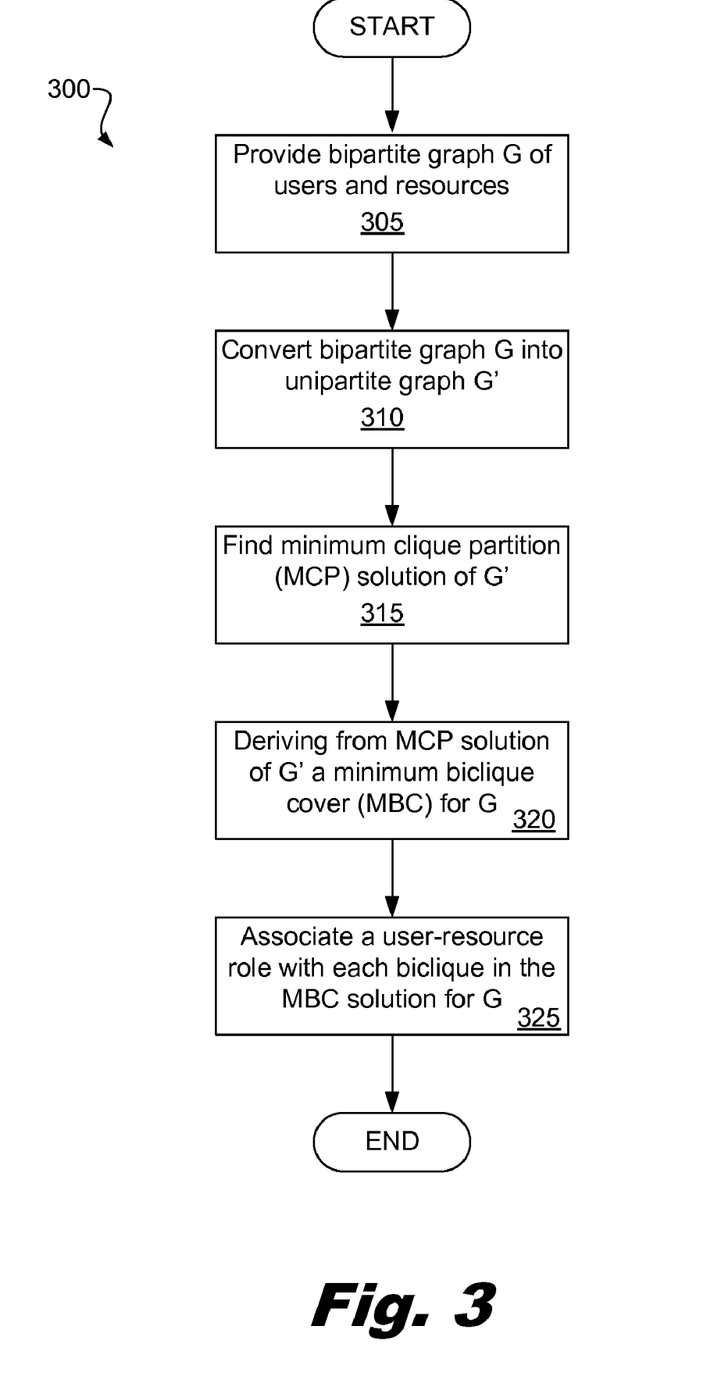
FIG. 3 is a flowchart diagram of an illustrative computer-implemented procedure for obtaining a minimum biclique cover in a bipartite dataset, according to one exemplary embodiment of the principles described herein.

Referring now to FIG. 3, a flowchart of an illustrative method (300) of biclique role discovery is shown. The method (300) may be executed by a computer system configured to execute the steps of the method (300), which may be stored by and read from computer-readable media. The method (300) includes providing (step 305) a bipartite graph G of users and resources. Edges may be drawn between specific users and specific resources that are indicative of access permissions, as described above.

The bipartite graph G may then be converted (step 310) into a unipartite edge dual graph G' according to the principles described in relation to FIG. 2. Particularly, vertices in the edge dual graph G' may represent edges in the bipartite graph. Edges between vertices in the edge dual graph G' may represent adjacency and/or membership in a biclique of their counterpart edges in G. A minimum clique partition (MCP) solution may then be found (step 315) for the edge dual graph G'. The minimum clique partition may be a partition of the edge dual graph G' into a minimum number of separate cliques formed by edges in the edge dual graph G' such that each vertex in the edge dual graph G' is a member of only one clique.

The MCP of the edge dual graph G' may correspond to a minimum biclique cover (MBC) of the original bipartite graph G. Therefore, by deriving from (step 320) the MCP solution of the edge dual graph G' a minimum biclique cover solution (MBC) and associating (step 325) a user-resource biclique role with each biclique in the MBC solution for the original bipartite graph G, a minimum number of biclique roles in the original bipartite graph G may be discovered.

Figure 4:
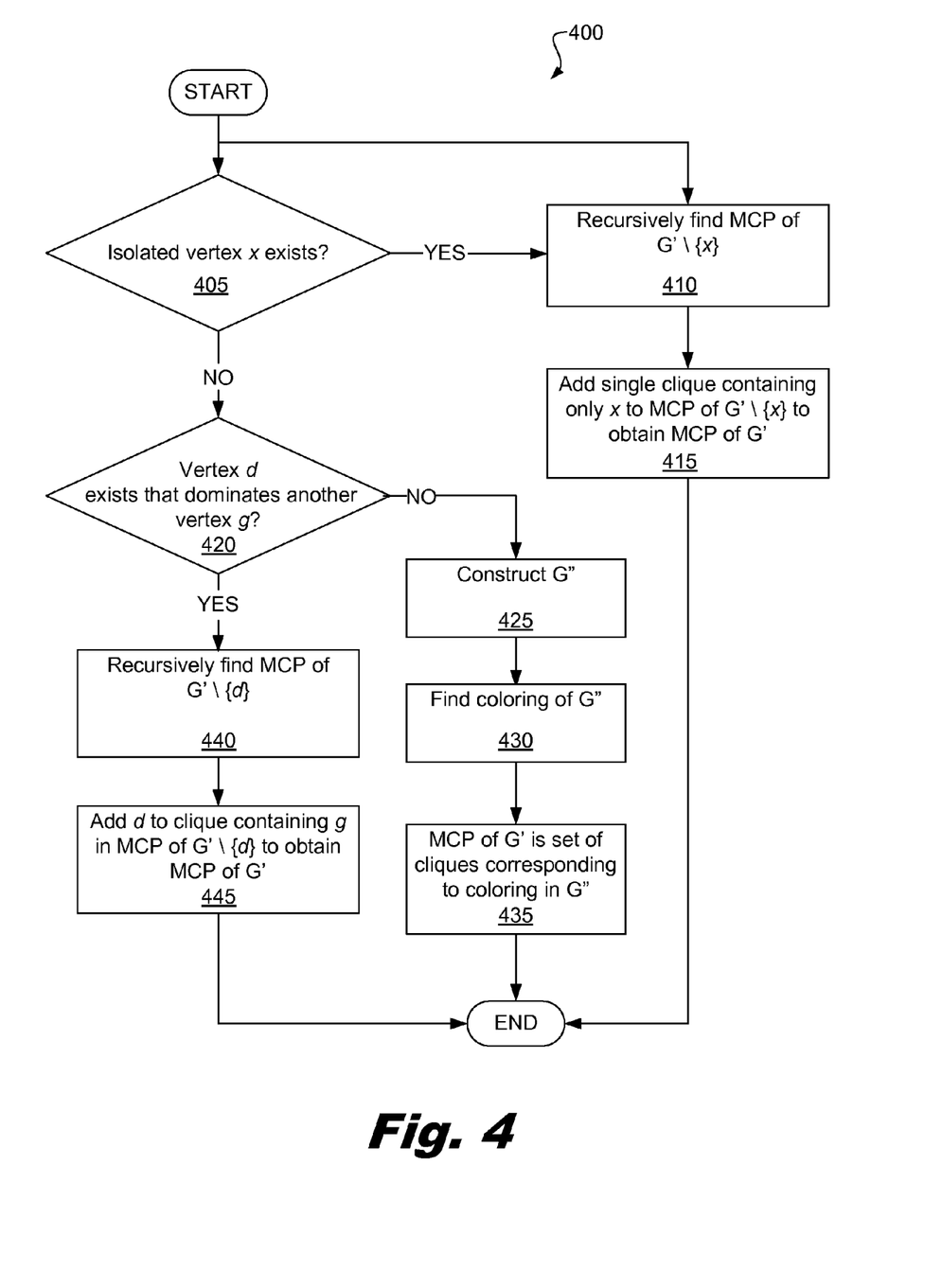
FIG. 4 is a flowchart diagram of an illustrative computer-implemented procedure for recursively finding a minimum clique partition of a unipartite edge dual graph, according to one exemplary embodiment of the principles described herein.

Referring now to FIG. 4, a flowchart of an illustrative method (400) of obtaining an exact minimum clique partition (MCP solution for an edge dual graph G' is shown. The present method (400) may also be executed by a computer system configured to execute the steps of the method (400), which may be stored by and read from computer-readable media. The method (400) is recursive in that multiple calls to itself may result in multiple nested iterations of the method (400) that are completed in a last in, first out (LIFO) order to obtain the desired solution.

The method (400) includes determining (decision 405) whether an isolated vertex x exists in the edge dual graph G'. An isolated vertex x is a vertex that has no neighbors (i.e. is not connected to any other vertex by an edge). This determination may be made by searching through each of the vertices of the edge dual graph G' until either an isolated vertex x is found or no more vertices remain. In certain embodiments, an algorithm may determine a particular order in which the vertices are searched for isolated vertices. Alternatively, the vertices may be searched randomly for an isolated vertex x.

If an isolated vertex x is found, then an MCP of the edge dual graph G' exists that consists of a clique containing x alone, together with an MCP of the subgraph induced by G'\{x}, where G'\{x} indicates the edge dual graph G' modified by the removal of x and any edges connected to x. Therefore, to find the MCP of G', all that needs to be done is recursively find (step 410) the MCP of G'\{x} and add (step 415) a single clique containing only x to the MCP of G'\{x}.

If an isolated vertex x is not found, then a determination must be made (decision 420) as to whether a vertex d exists that dominates another vertex g. A vertex d dominates another vertex g by definition if g and all of its neighbors are a subset of d and all of its neighbors. The determination may be made by searching through the edge dual graph G', either by algorithm or randomly, until a vertex d is found that dominates another vertex g or it is determined that no vertices exist in G'.

If no dominating vertex is found, G' is a kernel that can not be reduced further by recursively invoking the method (400). Therefore, the MCP of G' may be obtained by constructing (step 425) a new graph G" from G', wherein G" has all of the same vertices as G' and edges between vertices only where no edge exists between the vertices in G'. A minimum coloring of G" may then be found (step 430) using any method that may suit a particular application of the principles herein. For example, many suitable methods of finding a minimum coloring of G" exist and are known in the art. Additionally or alternatively, a method for finding the minimum coloring of G" that is customized to the principles herein may be used.

Once the minimum coloring of G" has been found, the MCP of G' may be determined (step 435) to be the set of cliques corresponding to each color in the coloring of G".

If, on the other hand, a vertex d is found in G' that dominates another vertex g, an MCP of G'\{d} is found (step 440) recursively and d is added (step 445) to the clique in the MCP of G'\{d} that contains g to obtain the MCP of G'.

Figure 5:
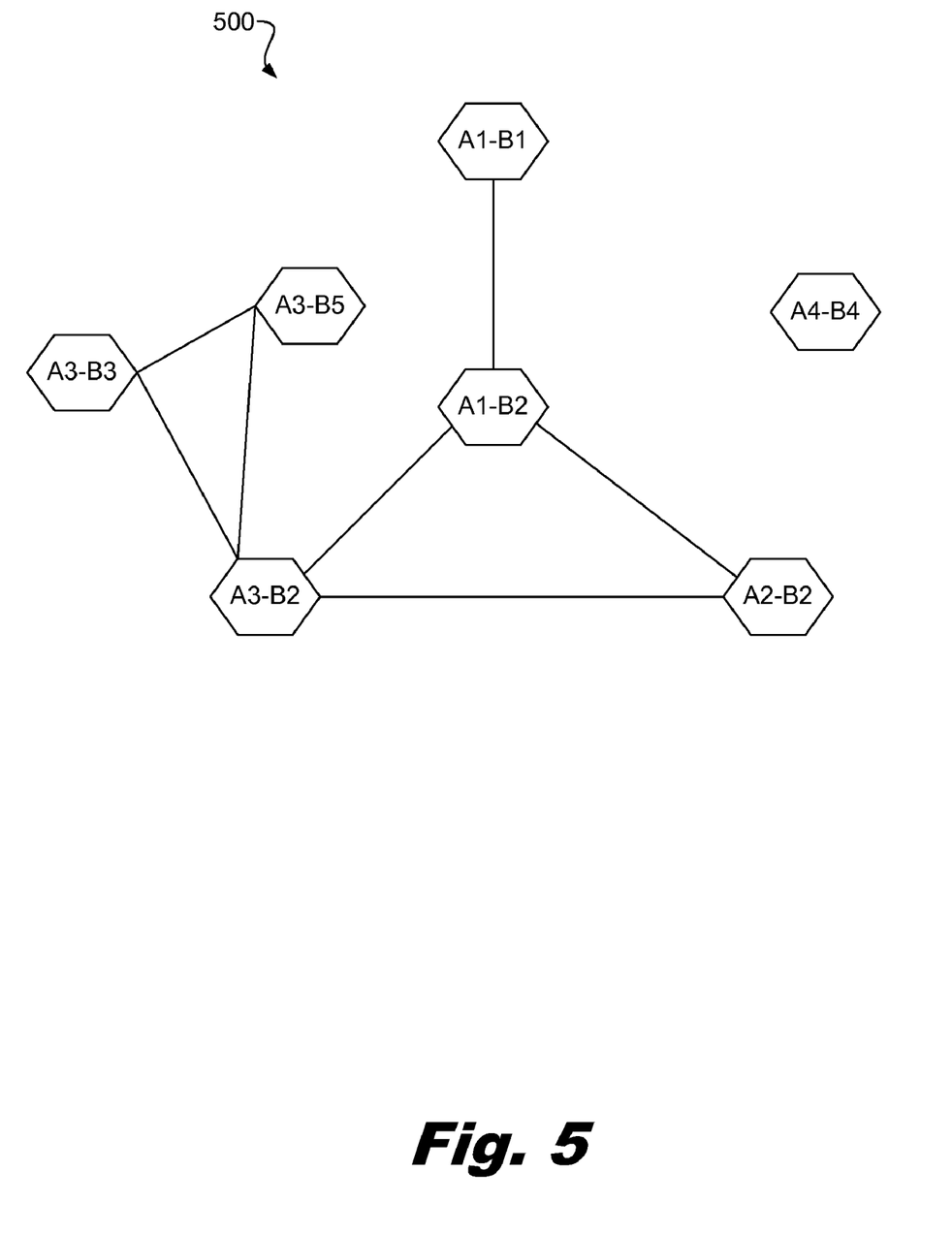
FIG. 5 is a diagram of an illustrative unipartite edge dual graph according to one exemplary embodiment of the principles described herein.

FIG. 5 is an illustrative edge dual graph (500) that will be used to illustrate the recursive nature of the method (400, FIG. 4) described above.

Referring now to FIG. 6, a diagram is shown of nested recursive iterations of the method (400, FIG. 4) described above in finding the MCP of the illustrative edge dual graph (500, FIG. 5). For brevity and consistency with the prior description of the method (400, FIG. 4), the edge dual graph (500, FIG. 5) is referred to as G'.

In a first iteration (605) of the method (400, FIG. 4), the isolated vertex A4-B4 is found. The isolated vertex A4-B4 will be added as a single-member clique to the MCP of G'\{A4-B4}. However, to find the MCP of G'\{A4-B4}, the method must be called on G'\{A4-B4}.

Figure 7A:
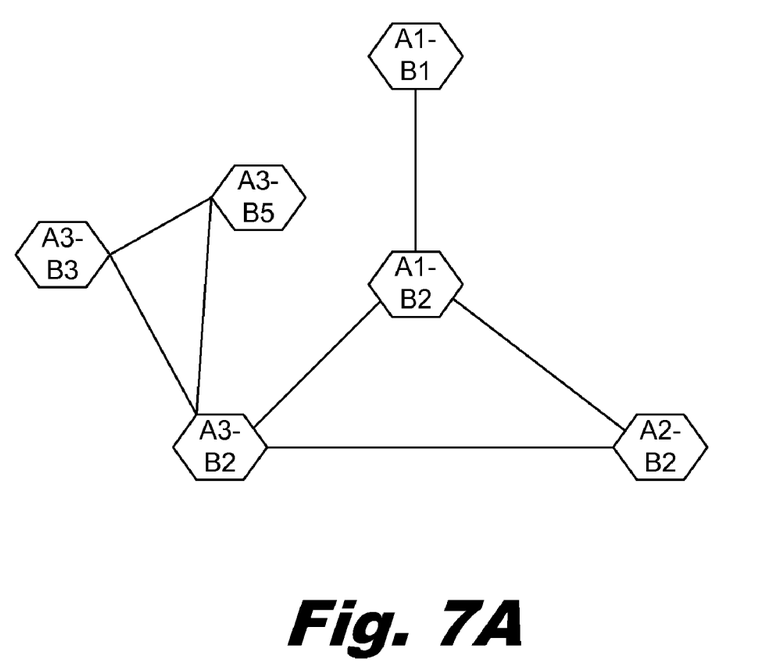
FIGS. 7A to 7F are diagram of the manipulation of the illustrative unipartite edge dual graph of FIG. 5 throughout various steps of illustrative recursive process of FIG. 6, according to one exemplary embodiment of the principles described herein.

In a second iteration (610), then, the method (400, FIG. 4) is performed on G'\{A4-B4}. FIG. 7A shows G'\{A4-B4}. In this iteration, vertex A1-B2 is found to dominate vertex A1-B2. Therefore, A1-B2 will be added to the clique containing A1-B1 in the MCP of G'\{A4-B4 & A1-A2} to obtain the MCP of G'\{A4-B4. Thus, the method (400, FIG. 4) must now be called on G'\{A4-B4 & A1-A2}.

Figure 7B:
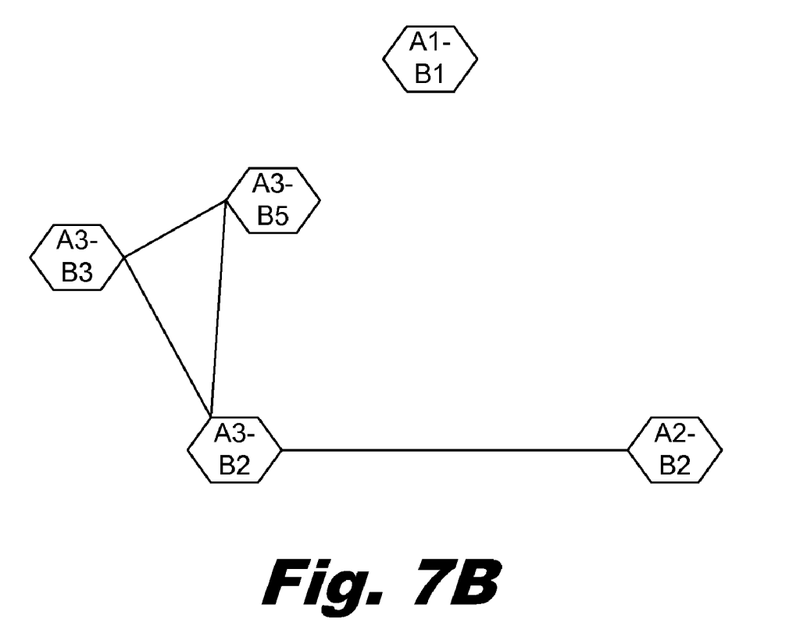

In a third iteration (615), the method (400, FIG. 4) is performed on G'\{A4-B4 & A1-A2}. FIG. 7B shows G'\{A4-B4 & A1-A2}. In this iteration, newly isolated vertex A1-B1 is found. A1-B1 must, then, be added as a single-member clique to the MCP of G'\{A4-B4 & A1-B2 & A1-B1} to obtain the MCP of G'\{A4-B4 & A1-A2}, thereby invoking the method (400, FIG. 4) a fourth time.

Figure 7C:
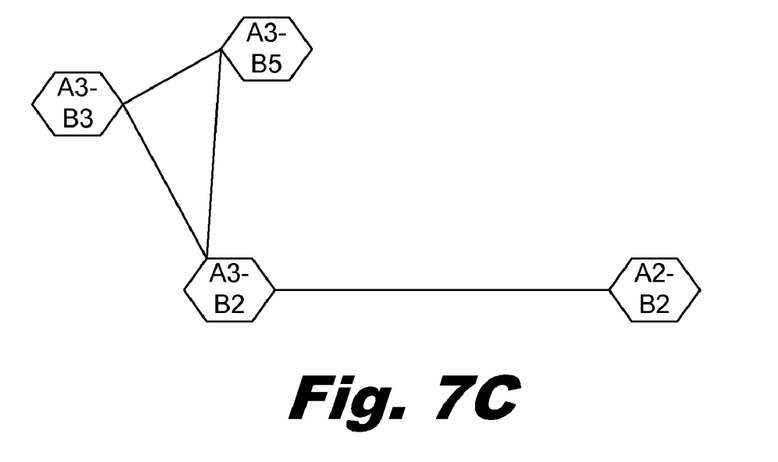

In a fourth iteration (620), the method (400, FIG. 4) is performed on G'\{A4-B4 & A1-B2 & A1-B1}, which is shown in FIG. 7C. Vertex A3-B2 is found to dominate vertex A3-B5. Therefore, to obtain the MCP of G'\{A4-B4 & A1-B2 & A1-B1}, an MCP must be found of G'\{A4-B4 & A1-B2 & A1-B1 & A3-B2} and vertex A3-B2 must be added to the clique therein that contains vertex A3-B5. Accordingly, the method (400, FIG. 4) must be invoked a fifth time.

Figure 7D:
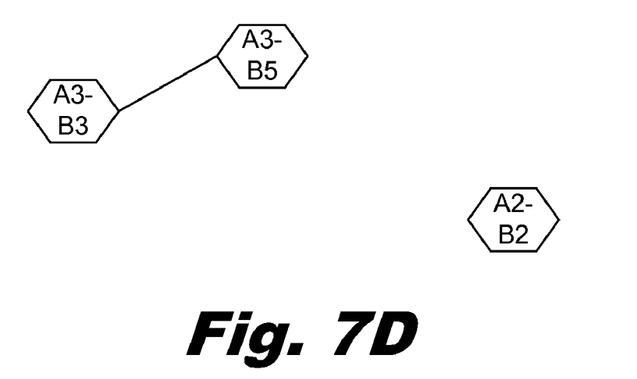

In a fifth iteration (625), the method (400, FIG. 4) is performed on G'\{A4-B4 & A1-B2 & A1-B1 & A3-B2}, which is shown in FIG. 7D. Newly isolated vertex A2-B2 is found. Therefore A2-B2 must be added as a single-member clique to the MCP of G'\{A4-B4 & A1-B2 & A1-B1 & A3-B2 & A2-B2} to obtain the MCP of G'\{A4-B4 & A1-B2 & A1-B1 & A3-B2}.

Figure 7E:
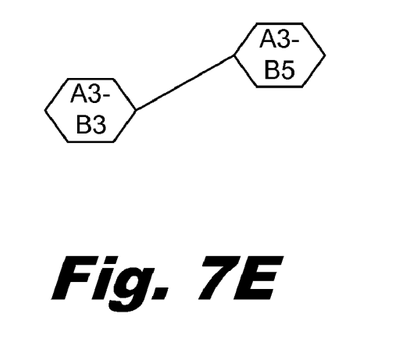

In a sixth iteration (630), the method (400, FIG. 4) is performed to find the MCP of G'\{A4-B4 & A1-B2 & A1-B1 & A3-B2 & A2-B2}, as shown in FIG. 7E. Vertex A3-B5 is found to dominate vertex A3-B3. Thus, vertex A3-B5 will be added to the clique containing A3-B3 in the MCP of G'\{A4-B4 & A1-B2 & A1-B1 & A3-B2 & A2-B2 & A3-B5} to obtain the MCP of G'\{A4-B4 & A1-B2 & A1-B1 & A3-B2 & A2-B2}.

Figure 7F:
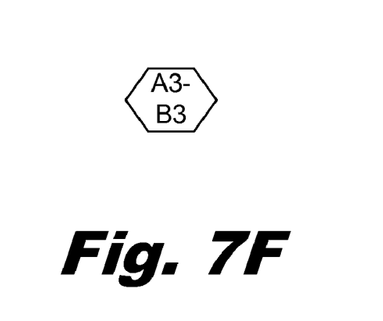

In a seventh iteration (635), the method (400, FIG. 4) is performed on G'\{A4-B4 & A1-B2 & A1-B1 & A3-B2 & A2-B2 & A3-B5}, which is shown in FIG. 7F. Isolated vertex A3-B3 is found. Therefore A3-B3 must be added as a single-member clique to the MCP of G'\{A4-B4 & A1-B2 & A1-B1 & A3-B2 & A2-B2 & A3-B5 & A3-B3} to obtain the MCP of G'\G'\{A4-B4 & A1-B2 & A1-B1 & A3-B2 & A2-B2 & A3-B5}.

In an eighth iteration (640), the method (400, FIG. 4) is performed on G'\{A4-B4 & A1-B2 & A1-B1 & A3-B2 & A2-B2 & A3-B5 & A3-B5}. Because no vertices remain, the method (400, FIG. 4) can determine the the MCP of the empty set (another empty set) without invoking the method (400, FIG. 4). Therefore, the chain of recursion ends with the eighth iteration (640), which returns an empty set to the seventh iteration (635).

The seventh iteration (635) then appends the single-member clique containing A3-B3 to the MCP returned by the eighth iteration (640), and returns it as an MCP to the sixth iteration (630). Control then percolates back up through the recursive iterations as each iteration finishes the method (400, FIG. 4) and returns an MCP until control is returned to the first iteration (605), which determines an MCP for the entire graph G'.

Figure 8:
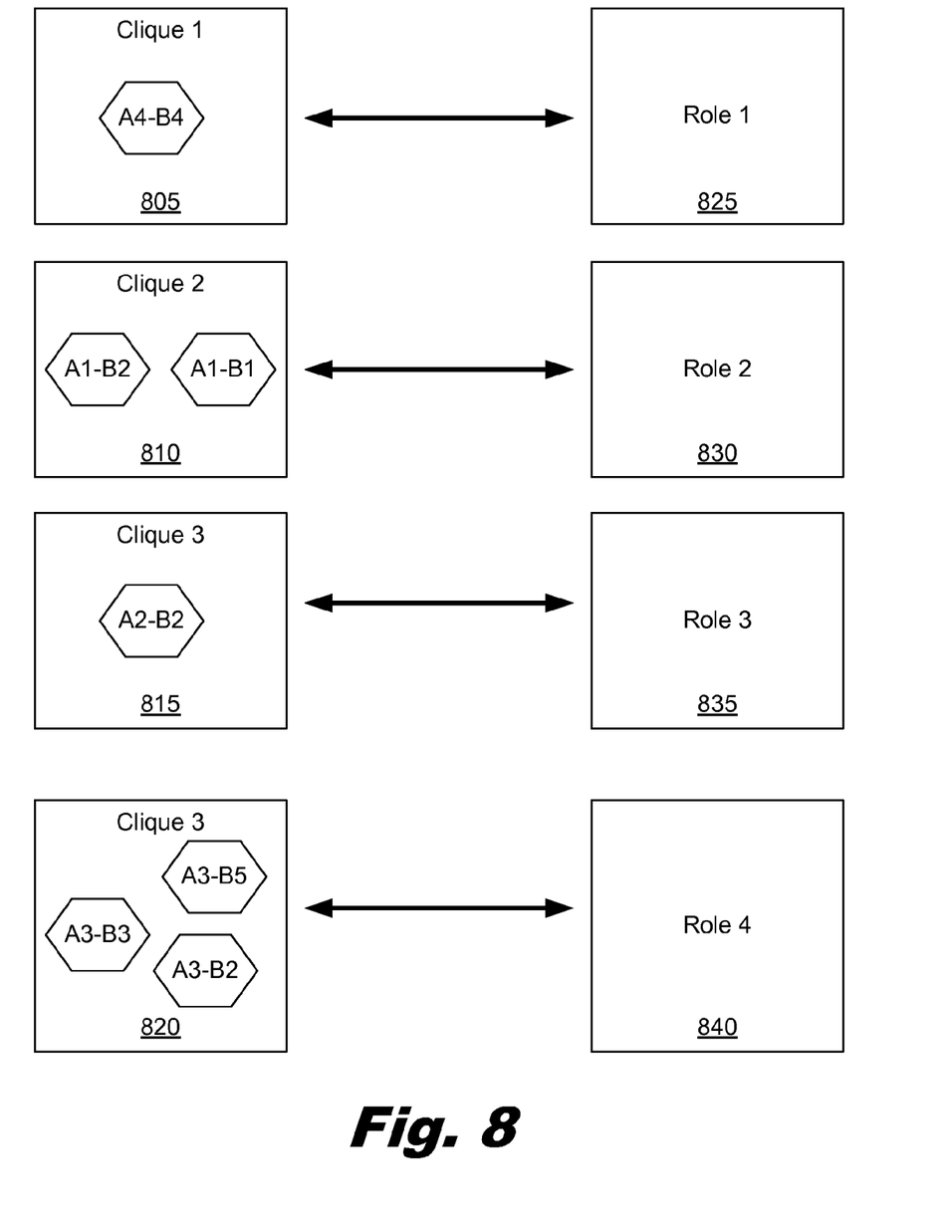
FIG. 8 is a diagram of an illustrative correlation between cliques in a minimum clique partition of a unipartite edge dual graph and biclique role discovery in a corresponding bipartite graph.

Referring now to FIG. 8, a diagram is shown of the resulting MCP from invoking the method (400, FIG. 4) on G' in the example of FIGS. 5-7 above. The MCP includes four cliques (805, 810, 815, 820) of vertices, with a first clique (805) including only vertex A4-B4, a second clique (810) containing vertices A1-B2 and A1-B1, a third clique (815) containing only vertex A2-B2, and a fourth clique (820) containing vertices A3-B5, A3-B3, and A3-B2. Each of the four cliques (805, 810, 815, 820) can be translated into a corresponding biclique role (825, 830, 835, 840, respectively) in an original bipartite user-resource graph for which G' is an edge dual graph.

This translation may be accomplished by determining which of the vertices of the first type (102) (representing users) in the bipartite graph and the vertices of the second type (104) (representing resources) in the bipartite graph are connected by edges in the bipartite graph that are represented by the vertices in each clique (805, 810, 815, 820) of the edge dual graph G'. Then each of the vertices of the first type (102) and the vertices of the second type (104) that are connected by edges in the bipartite graph that are represented by the vertices in the clique (805, 810, 815, 820) may be added to a biclique role (825, 830, 835, 840) in the bipartite graph corresponding to the clique (805, 810, 815, 820) in G'.

For example, the fourth clique (820) represents a biclique role in the original bipartite graph that is held only by user A3 and signifies permissive access to each of resources B2, B3, and B5.

Figure 9:
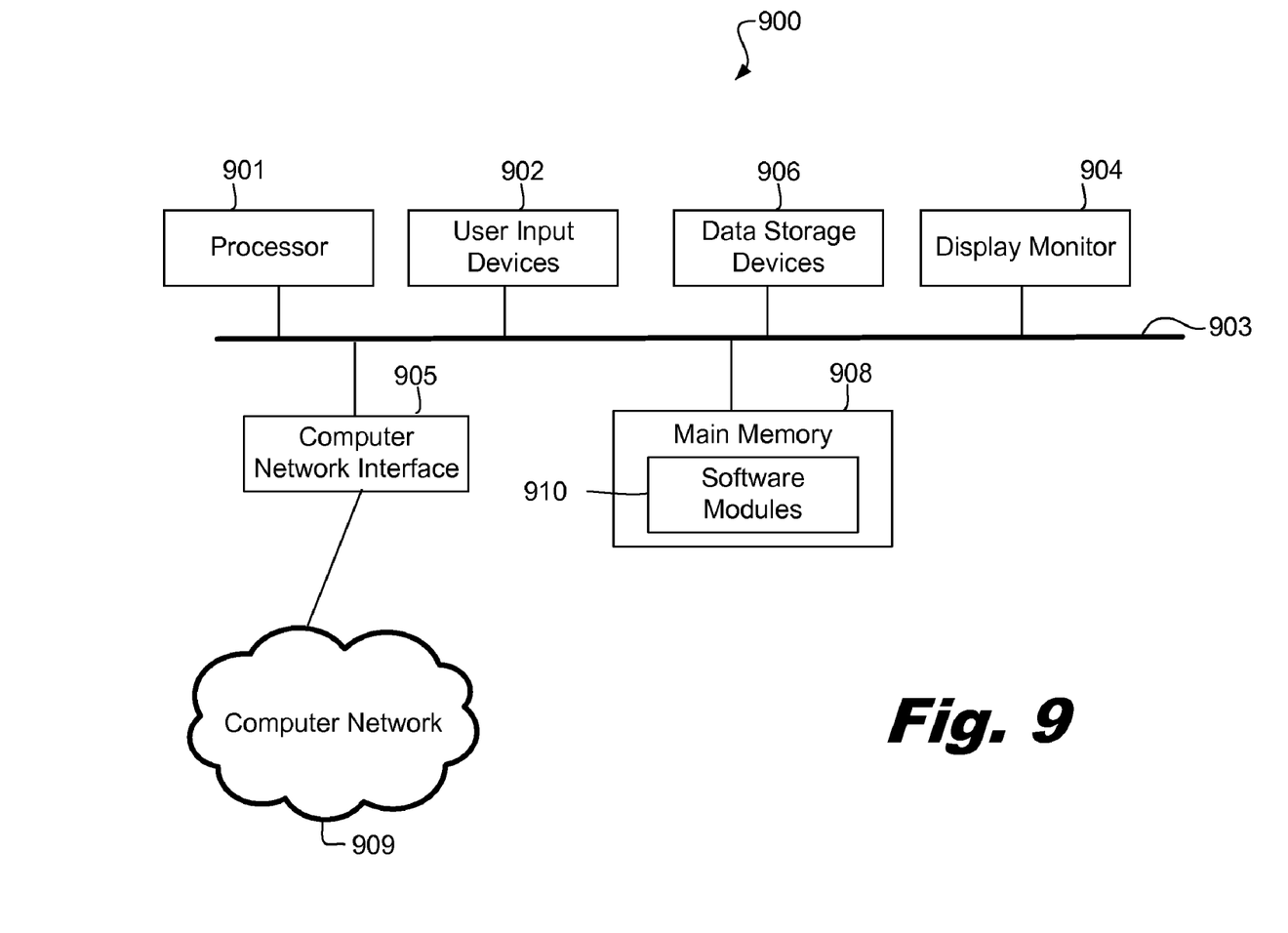
FIG. 9 is a schematic diagram of an illustrative computer system which may be used to execute the computer-implemented procedures for biclique role discovery in accordance with one exemplary embodiment of the principles described herein.

FIG. 9 is a schematic diagram of an example computer system or apparatus (900) which may be used to execute the computer-implemented procedures for biclique role discovery and biclique role reduction in accordance with an embodiment of the invention. The computer (900) may have fewer or more components than illustrated. The computer (900) may include a processor (901), such as those from the Intel Corporation or Advanced Micro Devices, for example. The computer (900) may have one or more buses (903) coupling its various components. The computer (900) may include one or more user input devices (902) (e.g., keyboard, mouse), one or more data storage devices (906) (e.g., hard drive, optical disk, USB memory), a display monitor (904) (e.g., LCD, flat panel monitor, CRT), a computer network interface (905) (e.g., network adapter, modem), and a main memory (908) (e.g., RAM).

In the example of FIG. 9, the main memory (908) includes software modules (910), which may be software components to perform the above-discussed computer-implemented procedures. The software modules (910) may be loaded from one or more data storage device (906) to the main memory (908) for execution by the processor (901). Specifically, the software modules (910) may include one or more modules of computer readable code for performing the tasks of biclique role discovery and simplification according to the principles described herein. The computer network interface (905) may be coupled to a computer network (909), which in this example includes the Internet.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method comprising:
providing a bipartite graph having vertices of a first type, vertices of a second type, and a plurality of edges, wherein each edge joins a said vertex of said first type with a said vertex of said second type;
generating a unipartite edge dual graph from said bipartite graph, wherein vertices in said edge dual graph represent said edges in said bipartite graph, and wherein edges in said edge dual graph represent adjacency in said bipartite graph or common membership of a biclique in said bipartite graph;
recursively determining a minimum clique partition of said edge dual graph; and
adding a biclique to a minimum biclique cover of said bipartite graph corresponding to each clique in said minimum clique partition of said edge dual graph.

2. The method of claim 1, wherein said recursively determining a minimum clique partition of said edge dual graph comprises:
responsive to finding an isolated vertex in said edge dual graph, obtaining said minimum clique partition of said edge dual graph by appending said isolated vertex to a minimum clique partition of said edge dual graph with said isolated vertex removed; and
responsive to an alternative finding that a first vertex dominates a second vertex in said edge dual graph, obtaining said minimum clique partition of said edge dual graph by appending said first vertex to a clique containing said second vertex in a minimum clique partition of said edge dual graph with said first vertex removed.

3. The method of claim 2, further comprising responsive to an alternative finding that no vertices remain in said edge dual graph, returning an empty minimum clique partition.

4. The method of claim 2, further comprising, responsive to an alternate finding that said edge dual graph comprises an irreducible kernel, invoking an alternative method of determining said minimum clique partition of said edge dual graph.

5. The method of claim 4, wherein said alternative method comprises generating a third graph from said unipartite edge dual graph, wherein said third graph has all the same vertices as the unipartite edge dual graph and edges between vertices only where no edge exists between vertices in said unipartite edge dual graph.

6. The method of claim 5, further comprising:
finding a minimum coloring of said third graph; and
determining said minimum clique partition of said unipartite edge dual graph based on a set of cliques corresponding to each color in the coloring of said third graph.

7. The method of claim 1, wherein said adding said biclique in said bipartite graph corresponding to each clique in said minimum clique partition of said edge dual graph comprises:
   determining which of said vertices of said first type and said vertices of said second type in said bipartite graph are connected by edges represented by vertices in a clique in said edge dual graph; and
   adding each of said vertices of said first type and said vertices of said second type connected by said edges represented by said vertices in said clique to a biclique in said bipartite graph corresponding to said clique in said edge dual graph.

8. The method of claim 1, wherein each said biclique in said bipartite graph corresponds to a set of one or more user-resource permissions.

9. The method of claim 1, wherein said recursively determining a minimum clique partition of said edge dual graph comprises nested iterations of said method completed in a "last-in, first-out" (LIFO) order.

10. A system, comprising:
   digital memory configured to store at least a bipartite graph having a plurality of vertices of a first type, a plurality of vertices of a second type, and a plurality of edges connecting said vertices of said first type with said vertices of said second type; and
   at least one processor in communication with said memory, said processor being configured to:
      generate a unipartite edge dual graph from said bipartite graph, wherein vertices in said edge dual graph represent said edges in said bipartite graph, and wherein edges in said edge dual graph represent adjacency in said bipartite graph or common membership of a biclique in said bipartite graph;
      recursively determine a minimum clique partition of said edge dual graph; and
      identify a biclique in said bipartite graph corresponding to each clique in said minimum clique partition of said edge dual graph.

11. The system of claim 10, wherein said recursively determining a minimum clique partition of said edge dual graph comprises:
   responsive to finding an isolated vertex in said edge dual graph obtaining said minimum clique partition of said edge dual graph by appending said isolated vertex to a minimum clique partition of said edge dual graph with said isolated vertex removed; and
   responsive to an alternative finding that a first vertex dominates a second vertex in said edge dual graph, obtaining said minimum clique partition of said edge dual graph by appending said first vertex to a clique containing said second vertex in a minimum clique partition of said edge dual graph with said first vertex removed.

12. The system of claim 11, wherein said processor is further configured to, responsive to an alternative finding that no vertices remain in said edge dual graph, return an empty minimum clique partition.

13. The system of claim 12, wherein said processor is further configured to, responsive to an alternate finding that said edge dual graph comprises an irreducible kernel, invoking an alternative method of determining said minimum clique partition of said edge dual graph.

14. The system of claim 13, wherein said alternative method comprises generating a third graph from said unipartite edge dual graph, wherein said third graph has all the same vertices as the unipartite edge dual graph and edges between vertices only where no edge exists between vertices in said unipartite edge dual graph.

15. The system of claim 14, wherein said alternative method further comprises:
   finding a minimum coloring of said third graph; and
   determining said minimum clique partition of said unipartite edge dual graph based on a set of cliques corresponding to each color in the coloring of said third graph.

16. The system of claim 10, wherein said processor is further configured to create said role in said bipartite graph corresponding to each clique in said minimum clique partition of said edge dual graph by:
   determining which of said vertices of said first type and said vertices of said second type in said bipartite graph are connected by edges represented by vertices in a clique in said edge dual graph; and
   adding each of said vertices of said first type and said vertices of said second type connected by said edges represented by said vertices in said clique to a biclique in said bipartite graph corresponding to said clique in said edge dual graph.

17. A computer program product comprising:
   a non-transitory, computer usable medium having computer usable program code embodied therewith, the computer usable program code comprising:
      computer usable program code configured to provide a bipartite graph having vertices of a first type, vertices of a second type, and a plurality of edges, wherein each edge joins a said vertex of said first type with a said vertex of said second type;
      computer usable program code configured to generate a unipartite edge dual graph from said bipartite graph, wherein vertices in said edge dual graph represent said edges in said bipartite graph, and wherein edges in said edge dual graph represent adjacency in said bipartite graph or common membership of a biclique in said bipartite graph;
      computer usable program code configured to recursively determine a minimum clique partition of said edge dual graph; and
      computer usable program code configured to create a biclique in said bipartite graph corresponding to each clique in said minimum clique partition of said edge dual graph.

18. The computer program product of claim 17, wherein said recursively determining a minimum clique partition of said edge dual graph comprises:
   responsive to finding an isolated vertex in said edge dual graph, obtaining said minimum clique partition of said edge dual graph by appending said isolated vertex to a minimum clique partition of said edge dual graph with said isolated vertex removed; and
   responsive to an alternative finding that a first vertex dominates a second vertex in said edge dual graph, obtaining said minimum clique partition of said edge dual graph by appending said first vertex to a clique containing said second vertex in a minimum clique partition of said edge dual graph with said first vertex removed.

19. The computer program product of claim 18, further comprising: computer usable program code configured to, responsive to an alternative finding that no vertices remain in said edge dual graph, return an empty minimum clique partition.

20. The computer program product of claim 19, further comprising computer usable program code configured to, responsive to an alternate finding that said edge dual graph comprises an irreducible kernel, invoking an alternative method of determining said minimum clique partition of said edge dual graph.

* * * * *